(12) United States Patent
Jansson et al.

(10) Patent No.: US 11,149,839 B2
(45) Date of Patent: Oct. 19, 2021

(54) DRIVELINE UNIT WITH INTERNAL LUBRICATION SYSTEM

(71) Applicant: GKN Automotive Limited, Worcestershire (GB)

(72) Inventors: Anders Jansson, Köping (SE); Brent M. Peura, Farmington, MI (US); Robert Pettersson, Västerås (SE); Daniel Lindberg, Odensbacken (SE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 16/766,794

(22) PCT Filed: Dec. 7, 2017

(86) PCT No.: PCT/US2017/065084
§ 371 (c)(1),
(2) Date: May 26, 2020

(87) PCT Pub. No.: WO2019/112584
PCT Pub. Date: Jun. 13, 2019

(65) Prior Publication Data
US 2020/0370638 A1 Nov. 26, 2020

(51) Int. Cl.
*F16H 57/04* (2010.01)
*F16H 57/03* (2012.01)
(Continued)

(52) U.S. Cl.
CPC ......... *F16H 57/0457* (2013.01); *F16H 57/02* (2013.01); *F16H 57/037* (2013.01);
(Continued)

(58) Field of Classification Search
CPC .... F16H 57/0457; F16H 57/02; F16H 57/037; F16H 57/0424; F16H 57/0452;
(Continued)

(56) References Cited

U.S. PATENT DOCUMENTS 3,529,698 A * 9/1970 Nelson ............... F16H 57/0447
184/6.12
3,762,503 A 10/1973 Wilder et al.
(Continued)

FOREIGN PATENT DOCUMENTS

DE 1047820 B 12/1958
DE 10254572 A1 3/2004
(Continued)

OTHER PUBLICATIONS

Yang; Lei, et al.; Lubricant Guide for a Vehicle Axle; The Industry Standard Disclosure Publication Service; Published Digitally Nov. 1, 2016, 7 pages; Research Disclosure Database No. 632029.
(Continued)

*Primary Examiner* — Tisha D Lewis
(74) *Attorney, Agent, or Firm* — Jennifer M. Brumbaugh; Reising Ethington P.C.

(57) ABSTRACT

In at least some implementations, an automotive driveline unit includes a main housing having an interior and a first reservoir in the interior arranged to collect lubricant, the main housing also having a feed passage that is open to the first reservoir, a gear located within the interior and having a periphery arranged in the first reservoir so that rotation of the gear causes the gear to engage and displace some of the lubricant from the first reservoir, and a second housing carried by the main housing. A second reservoir is defined between the main housing and the second housing, the second reservoir is communicated with the first reservoir via the feed passage and includes multiple, spaced apart outlets through which lubricant exits the second reservoir at different locations to provide lubricant to different areas of the interior of the main housing.

20 Claims, 12 Drawing Sheets

(51) Int. Cl.
*F16H 57/02* (2012.01)
*F16H 57/037* (2012.01)

(52) U.S. Cl.
CPC ..... *F16H 57/0424* (2013.01); *F16H 57/0452* (2013.01); *F16H 57/0483* (2013.01); *F16H 57/0495* (2013.01); *F16H 2057/02013* (2013.01); *F16H 2057/02043* (2013.01)

(58) Field of Classification Search
CPC ............. F16H 57/0483; F16H 57/0495; F16H 2057/02013; F16H 2057/02043
See application file for complete search history.

(56) References Cited

U.S. PATENT DOCUMENTS

| | | | |
|---|---|---|---|
| 5,161,644 A * | 11/1992 | Swenskowski | F16H 57/0447 |
| | | | 184/6.12 |
| 5,709,135 A | 1/1998 | Baxter | |
| 6,938,731 B2 | 9/2005 | Slesinski | |
| 7,322,900 B2 | 1/2008 | Ichioka et al. | |
| 7,892,131 B2 | 2/2011 | Hilker et al. | |
| 8,167,758 B2 | 5/2012 | Downs et al. | |
| 8,746,405 B2 | 6/2014 | Perakes et al. | |
| 8,845,473 B2 | 9/2014 | Nett et al. | |
| 9,291,212 B2 | 3/2016 | Nett et al. | |
| 2011/0245010 A1 | 10/2011 | Nobata et al. | |
| 2013/0019707 A1* | 1/2013 | Ebihara | F16H 57/045 |
| | | | 74/468 |
| 2013/0145879 A1* | 6/2013 | Nakamura | F16H 57/043 |
| | | | 74/467 |
| 2015/0267803 A1* | 9/2015 | Marathe | F16H 57/0483 |
| | | | 184/6.12 |
| 2015/0354691 A1 | 12/2015 | Keeney et al. | |
| 2016/0290484 A1 | 10/2016 | Lenczewski et al. | |
| 2017/0089451 A1 | 3/2017 | Keane et al. | |
| 2020/0271194 A1* | 8/2020 | Takahashi | F16H 48/38 |

FOREIGN PATENT DOCUMENTS

| | | |
|---|---|---|
| DE | 102010010411 A1 | 9/2011 |
| EP | 2230423 A1 | 9/2010 |
| EP | 2988027 A2 | 2/2016 |
| FR | 2744508 A1 | 8/1997 |
| GB | 1115446 A | 5/1968 |
| WO | WO2013167541 A1 | 11/2013 |

OTHER PUBLICATIONS

Written Opinion & International Search Report for PCT/US2017/065084 dated Mar. 8, 2018, 13 pages.
EP Extended Search Report for EP Application No. 17934265.4 dated Jun. 15, 2021 (10 pages).

* cited by examiner

# DRIVELINE UNIT WITH INTERNAL LUBRICATION SYSTEM

TECHNICAL FIELD

The present disclosure relates generally to automotive driveline units such as but not limited to, power transfer units (PTUs), final drive units (FDUs), and rear drive units (RDUs), and relates more particularly to internal lubrication systems for automotive driveline units.

BACKGROUND

In general, automotive drivelines transmit torque from an engine to the vehicle wheels. Automotive drivelines, such as all-wheel drive (AWD) drivelines, sometimes include power transfer units (PTUs), final drive units (FDUs), rear drive units (RDUs), or a combination of these units to transmit the torque. The PTUs, FDUs, and RDUs typically include gears, shafts, bearings, seals, and other components. Lubricant is used to both lubricate and cool these components. The lubricant in a unit ordinarily makes its way to some of its components when the lubricant is sloshed and splashed about from a relatively large volume sump or reservoir during use of the unit. The large volume sump includes a greater volume of fluid through which one or more gears and shafts must rotate and this provides drag losses and reduces the efficiency of the unit. Further, with the large volume sump, some areas of the unit receive more oil than is needed, oil is splashed uncontrolled in all directions, and/or components receive oil at times when oil is not needed or do not get oil when it is needed.

SUMMARY

In at least some implementations, an automotive driveline unit includes a main housing having an interior and a first reservoir in the interior arranged to collect lubricant, the main housing also having a feed passage that is open to the first reservoir, a gear located within the interior and having a periphery arranged in the first reservoir so that rotation of the gear causes the gear to engage and displace some of the lubricant from the first reservoir, and a second housing carried by the main housing. A second reservoir is defined between the main housing and the second housing, the second reservoir is communicated with the first reservoir via the feed passage and includes multiple, spaced apart outlets through which lubricant exits the second reservoir at different locations to provide lubricant to different areas of the interior of the main housing.

In at least some implementations, the second housing has a sidewall with first and second ends, an end wall coupled to the first end of the sidewall and an open end that is defined by the second end of the sidewall. The second end of the sidewall may be engaged with the main housing or received within a void formed in the main housing to define the second reservoir between the main housing, the sidewall and the end wall. A retention feature may be carried by the second housing and engaged with the main housing to retain the position of the second housing relative to the main housing. The main housing may include a groove in which is received at least 30% of the length of the second end sidewall. Multiple differential gears may be provided and the second housing may be radially outwardly of and axially overlapped with at least one part of one differential gear.

In at least some implementations, the gear is a driven gear that rotates about an axis and a drive gear engages the driven gear at a mesh area and wherein a portion of the second housing is disposed radially outwardly of and axially overlapped with the mesh area. The driven gear may be coupled to a shaft and the sidewall may be radially outwardly spaced from the shaft and the sidewall axially overlaps the shaft. The second housing may include a first outlet located radially above the mesh area so that fluid that exits the first outlet under the force of gravity engages at least one in the mesh area. The second housing may be located within the interior of the main housing.

In at least some implementations, the feed passage includes an inlet arranged radially outwardly of the gear relative to a rotational axis of the gear, and the feed passage includes a midsection that extends axially from the inlet to an outlet that is open to the second reservoir. The inlet may be arranged generally tangentially to the gear and may be defined by an upstream portion and a downstream portion wherein the downstream portion is closer to the gear than is the upstream portion.

In at least some implementations, the main housing includes a wall having an enclosed portion that defines part of the second reservoir and a lubricant outlet is formed through the wall in the enclosed portion to provide lubricant to components on an opposite side of the wall as the second housing.

In at least some implementations, an automotive driveline unit includes a main housing, a first shaft, a first gear coupled to the first shaft, a second shaft, a second gear coupled to the second shaft and a second housing carried by the main housing. The main housing has an interior and a first reservoir in the interior arranged to collect lubricant, the main housing also has a feed passage that is open to the first reservoir and a wall with a first opening and wherein the housing includes a second opening spaced from the wall. The first shaft extends through the first opening and has at least a portion within the interior. The first gear rotates with the first shaft, is located within the interior, and has a portion of its periphery located in the first reservoir so that rotation of the first gear causes the first gear to engage and displace some of the lubricant from the first reservoir. The second shaft extends through the second opening, has at least a portion within the interior, and is oriented so that it is not parallel to the first shaft. The second gear rotates with the second shaft, is meshed with the first gear, and is received within the interior. And the second housing is carried by the main housing and defines at least part of a second reservoir that is in communication with the first reservoir via the feed passage. The second reservoir includes multiple, spaced apart outlets through which lubricant exits the second reservoir at different locations to provide lubricant to different areas of the interior of the main housing, at least two outlets are arranged at different heights relative to gravity and at least two outlets have different flow areas to control the distribution of lubricant from the second reservoir.

In at least some implementations, the second housing is coupled to the main housing and the second reservoir is defined between the second housing and a portion of the main housing. The portion of the main housing to which the second housing is coupled may include the wall. And an outlet of the second reservoir may extend through the wall.

In at least some implementations, the first gear is received in a portion of the main housing that has a varying radial dimension so that a gap between the periphery of the first gear and the main housing is not of constant radial dimension. The gap may be smaller in the area of the first reservoir than it is at a location outside of the first reservoir. The axial width of the portion of the main housing in which the first gear is received may vary along the circumferential extent of that portion of the housing. And the axial width may be less in the first reservoir than at a location circumferentially spaced from the first reservoir by 60 or more degrees.

BRIEF DESCRIPTION OF THE DRAWINGS

The following detailed description of preferred implementations and best mode will be set forth with regard to the accompanying drawings, in which.

DETAILED DESCRIPTION

Referring in more detail to the drawings, FIGS. 1-7 illustrate an automotive driveline unit 10 including a main housing 12 in which multiple gears, shafts bearings and seals are located as will be described later. The housing 12 includes a first reservoir and a second reservoir each of which may contain or store, at least temporarily, some volume of lubricant. The first and second reservoirs are communicated with each other via one or more fluid passages so that fluid may flow between the reservoirs and generally within the housing to lubricate various components of the unit 10. The automotive driveline unit 10 can be, for example, a power transfer unit (PTU), a final drive unit (FDU) or a rear drive unit (RDU). In this regard, the phrase "automotive driveline unit" is used in a broad sense to embrace PTUs, FDUs, and RDUs and related devices. Furthermore, as an aside, the terms "downstream" and "upstream" are used with respect to the direction of lubricant flow, such that downstream refers to a direction that follows the flow of lubricant, and upstream refers to a direction that goes against the flow of lubricant. Other relational terms such as "above" or "below" refer to the normal orientation of the unit and with respect to the direction of the force of gravity.

Figure 1:
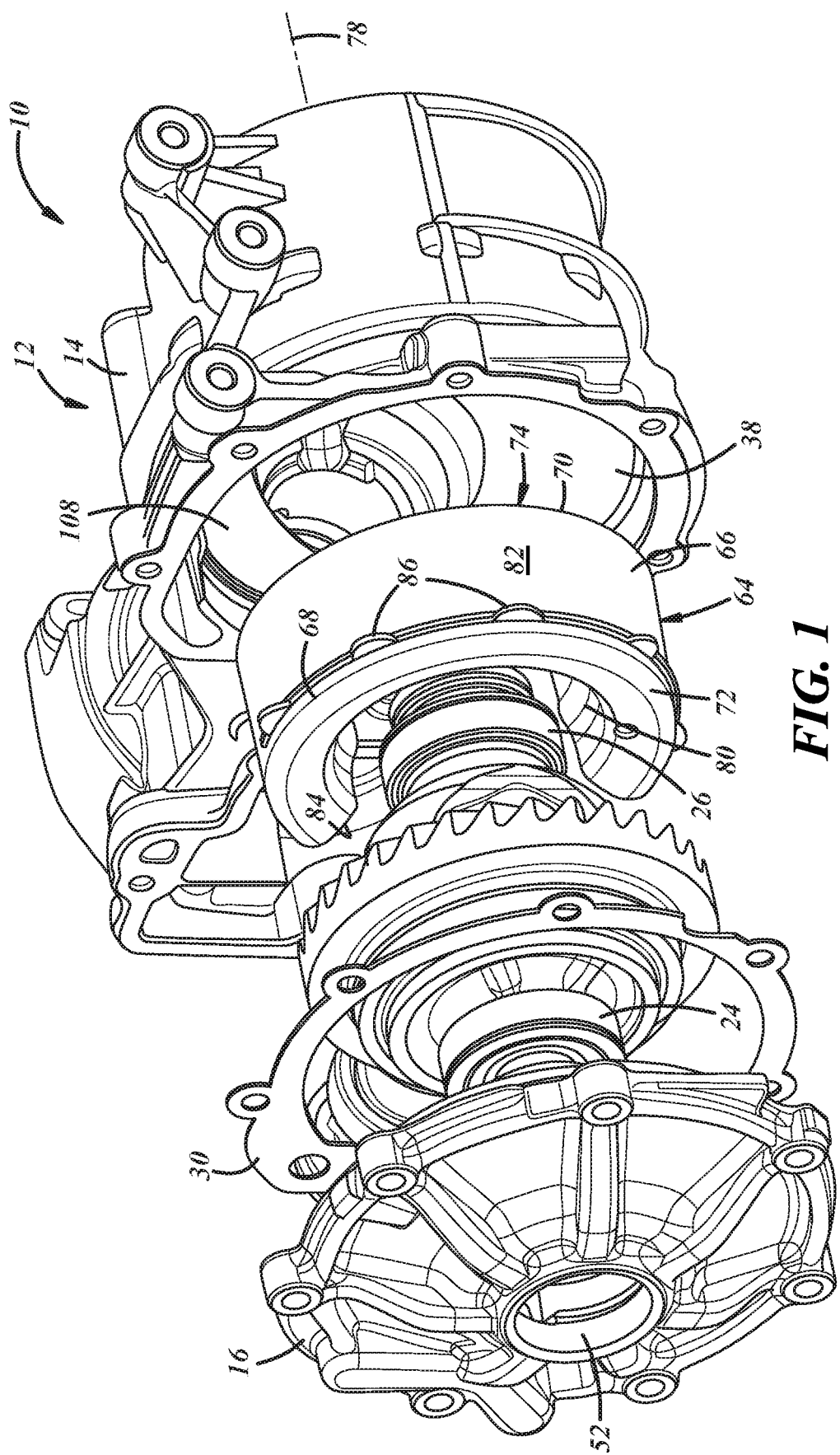
FIG. 1 is an exploded perspective view of a final drive unit.
Figure 6:
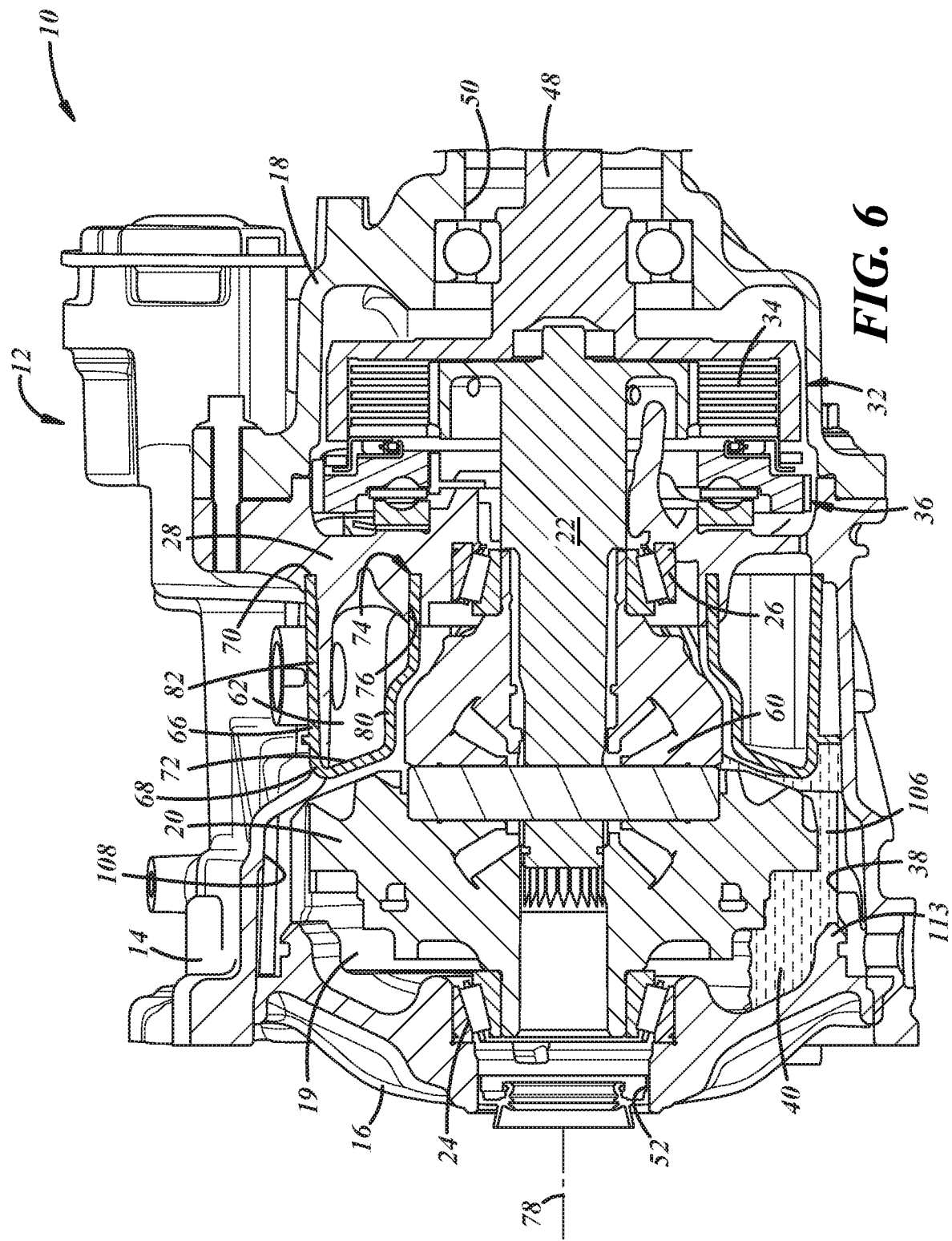
FIG. 6 is another sectional view of the final drive unit and secondary sump.

Referring to FIGS. 1 and 6, the driveline unit housing 12 includes a main body 14, a first cover 16 coupled to the main body to enclose a first end or side of the main body and a second cover 18 coupled to and closing a second end or side of the main body. The main body 14 and covers 16, 18 define at least part of an interior 19 of the housing 12. Received within the interior 19 are a first gear 20, which may be an annular, ring gear or crown wheel, a shaft 22 coupled to and rotating with the gear 20, a first bearing 24 between the gear/shaft and cover 16, a second bearing 26 between the shaft 22 and an intermediate wall 28 (FIG. 6) of the main body 14, a gasket 30 between the main housing and cover, a clutch 32 including a clutch plate pack 34 and a clutch actuator 36, as well as many other components.

Figure 5:
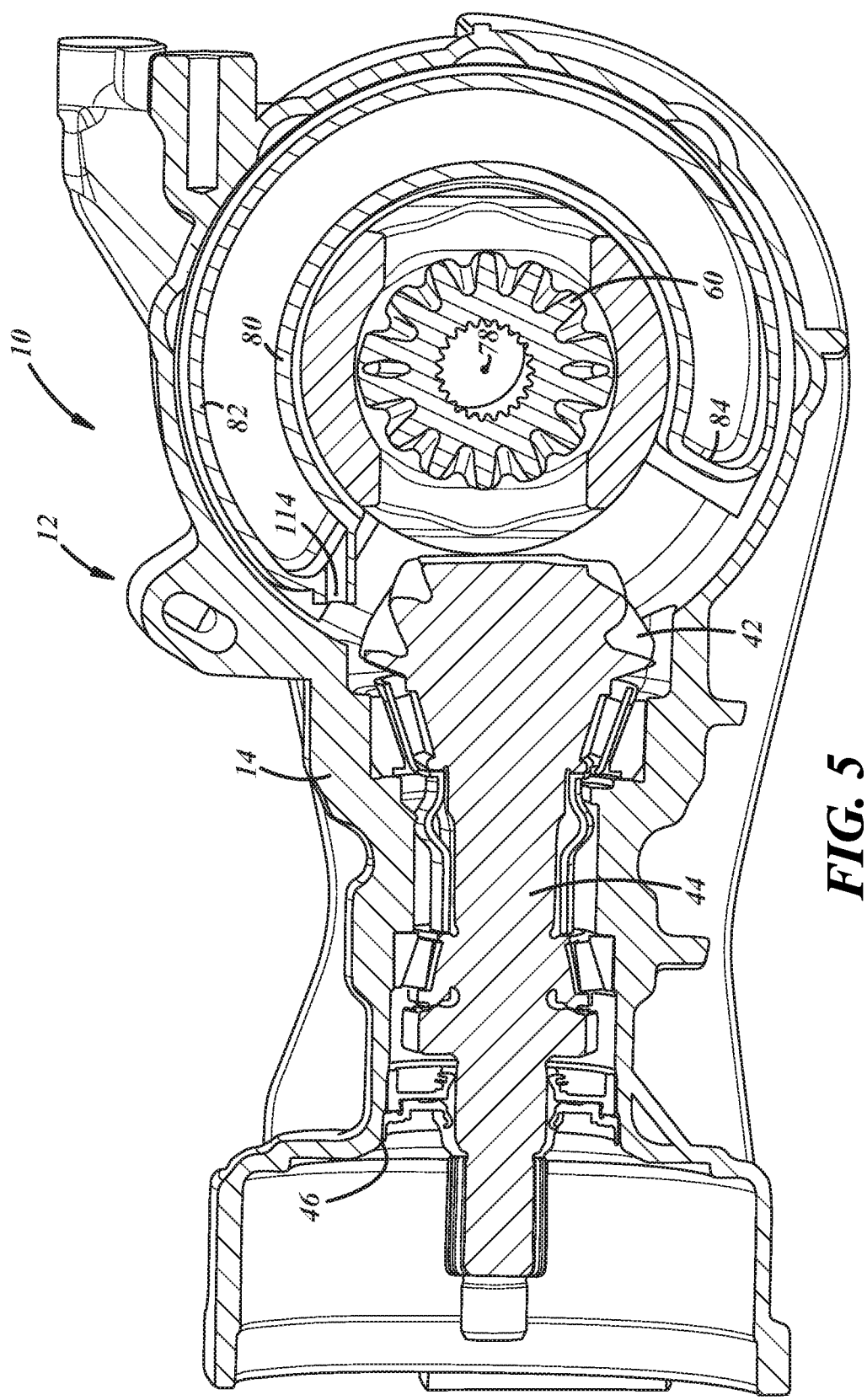
FIG. 5 is another sectional view of the final drive unit and secondary sump.

A first reservoir 38 is defined by an open space in a gravitationally lower portion of the housing interior 19 and in assembly, receives and holds lubricant 40 (FIG. 6) used to lubricate and cool the various components in the unit 10. The gear 20 is partially received within the first reservoir 38 and is partially immersed in the lubricant 40 within the reservoir. When the gear 20 is rotated, the gear displaces (e.g. sloshes, splashes or propels/flings) some of the lubricant 40 out of the first reservoir 38 and toward other areas of the interior 19 and toward various components in the interior. In addition to or instead, other components of the unit 10 could displace and distribute lubricant. The gear 20 can be a hypoid ring gear as depicted, or can be another type of gear. The gear 20 can mesh with a second gear, which may be an input gear 42 (which may be a pinion gear as shown in FIG. 5) that is connected, for example, to a second shaft (which may be an input shaft 44 that can in turn be connected to a propeller shaft) generally oriented at a right angle to the shaft 22.

The input shaft 44 may have an end received within the interior 19 through an opening 46 in the main body 14 of the housing 12. A first output shaft 48 (FIG. 6) is partially received in the interior 19 through a second opening 50 defined at least in part by the second cover 18 and in the example shown is coupled to the shaft 22 by the clutch 32. A second output shaft (not illustrated) is partially received in the interior 19 through a third opening 52 that is coaxially aligned with the second opening 50 and defined at least in part by the first cover 16. The gear 20 may be supported on a differential housing which in turn may be supported in the drive unit 10 at a first location by the bearing 24 between the first cover 16 and the differential housing and at a second location by the bearing 26 received between the differential housing and the radially inwardly extending intermediate wall 28 of the main body 14, which has an opening 58 through which the shaft 22 (or first side shaft) extends. Differential gears 60 may be provided adjacent to the gear 20 and within the differential housing to permit the side shafts to rotate at different speeds, as is known in the art. The shaft 22 may then be supported in a first location by the differential gears 60 and at a second location by the clutch plate pack 34. In at least some implementations, the input gear 42 and gear 20 are meshed on a side of the wall 28 that faces the first cover 16, and the clutch 32 is arranged on an opposite side of the wall 28 that faces the second cover 18.

In this example, the clutch 32 provides disconnect and re-connect capabilities in the unit 10 to selectively drive the output shaft 48 of the vehicle. The plate pack 34 has multiple plates that are pressed together in a connected state to transmit torque and rotation between the shaft 22 and the output shaft 48 a portion of which defines an outer carrier of the plate pack 34 (and an inner carrier is defined on or carried by the shaft 22). When in a disconnected state, the plates of the pack 34 are separated and torque and rotation are not transmitted between the shaft 22 and output shaft 48.

To aid in lubricating the components of the driveline unit 10, a second reservoir 62 for the lubricant is provided within the interior 19. In at least some implementations, the second reservoir 62 is defined between a second housing 64 and a portion of the main body 14. The second housing 64 may have a sidewall 66 with first and second ends 68,70, an end wall 72 coupled to the first end 68 of the sidewall and an open end 74 that is defined by the second end 70 of the sidewall. The second end 70 of the sidewall 66 may be engaged with the main housing 14 or have at least a portion received within a void 76 formed in the main housing to define the second reservoir 62 between the main housing 14, the sidewall 66 and the end wall 72. In at least some implementations, the main housing includes a groove 76 in which at least 30% of the length of the second end 70 is received, where the length is the perimeter of the second end. Because it is or may be ok if lubricant escapes the second reservoir 62, as such lubricant would return to the first reservoir 38, a fluid tight seal is not needed between the second housing 64 and main housing 14, but a seal could be provided, if desired.

Figure 3:
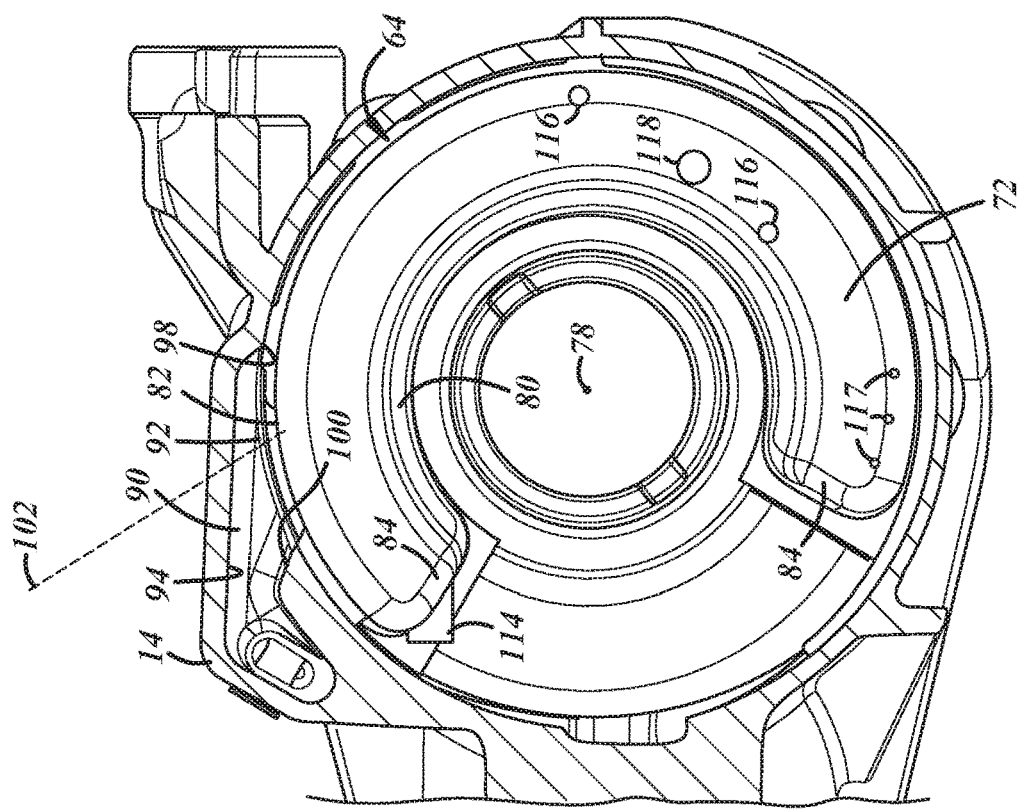
FIG. 3 is another sectional view of the final drive unit illustrating a secondary sump.
Figure 4:
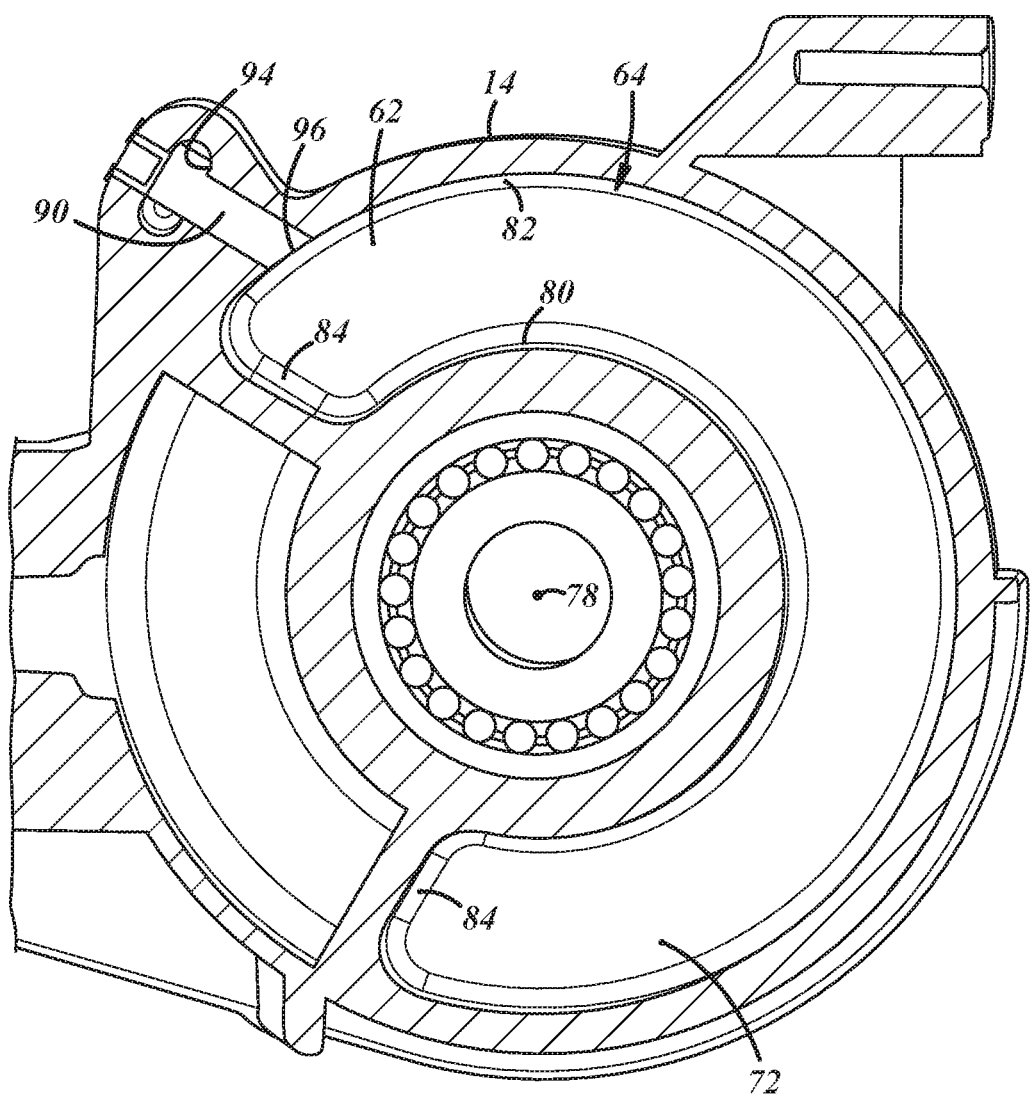
FIG. 4 is another sectional view of the final drive unit and secondary sump.

The sidewall 66 may be generally C-shaped, and may be oriented so that the second housing 64 is concave when viewed from a centerline or axis 78 of the shaft 22. In this way, as shown in FIGS. 3-5, the sidewall 66 has spaced apart inner and outer incurvate sections 80, 82 with the inner section 80 located radially inwardly of the outer section 82, and the sidewall 66 has end sections 84 that join the lateral ends of the inner and outer incurvate sections 80, 82 so that the sidewall is circumferentially continuous (other than with regard to various outlets as described below). In at least some implementations, the inner and outer sections 80, 82 extend generally circumferentially and the end sections 84 extend generally radially relative to the axis 78, although other orientations may be used as desired.

To retain, or aid in retaining, the position of the second housing 64 relative to the main body 14, a retaining feature may be coupled to or integrally formed on the second housing. The retaining feature may engage or be coupled to the main body. In the example shown, the retaining feature includes a plurality of tabs 86 (FIG. 1) that extend outwardly from the outer section 82 of the sidewall 66 to frictionally engage an inner surface of the main body 14. Of course, fasteners, adhesives or other retaining features could be used instead or in addition to the retaining tabs 86. In addition to retaining the second housing 64, the tabs 86 may damp vibrations between the main body 14 and second housing 64, and otherwise generally damp vibrations in the main housing. In this regard, the second housing 64 may be formed of any suitable material, including various polymers, and the retaining tabs may be formed from the same material (e.g. can be formed in the same piece of material as the sidewall and end wall) or from a different material, such as a more flexible material (perhaps an elastomer). So arranged, the second housing 64 can be simply pressed or pushed into a cavity and groove 76 of the main body 14, with the tabs 86 slidably and frictionally engaging the main body, before the gear 20, shaft 22 and first cover 16 are installed. To better retain the position of the second housing 64, the tabs 86 could be received within voids 88 (e.g. slots or a groove) in the main body 14, if desired.

The second reservoir 62 is communicated with the first reservoir 38 by one or more feed passages—in the example shown, a single feed passage 90 (FIGS. 2-4) is used and will be described further herein. The feed passage 90 includes an inlet 92 that is communicated with the first reservoir 38 and is arranged radially outwardly of the gear 20 relative to a rotational axis 76 of the gear. The inlet 92 is communicated with or leads to a midsection 94 that has at least a portion that extends axially from the inlet and which leads to an outlet 96 of the feed passage 90. The outlet 96 is in turn communicated with the second reservoir 62. Thus, lubricant from the first reservoir 38 is directed into and through the inlet 92, midsection 94 and outlet 96 (FIG. 4) of the feed passage 90 and from there to the second reservoir 62.

Figure 2:
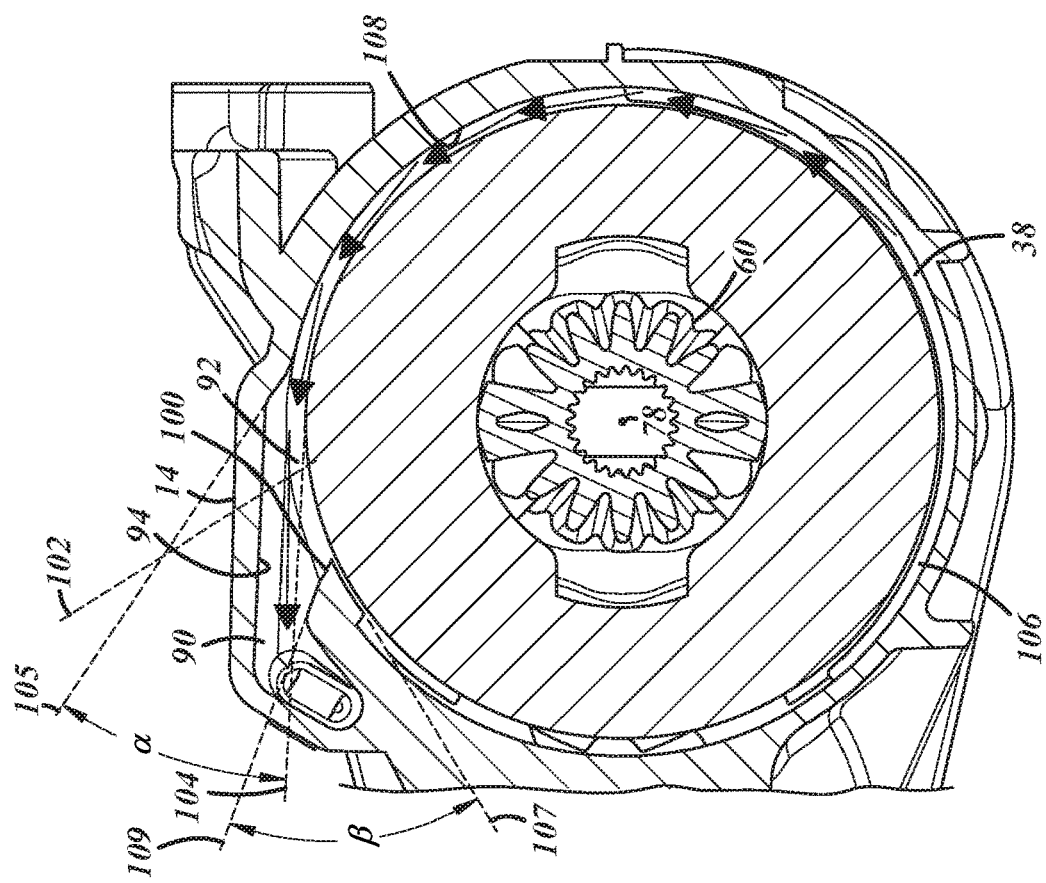
FIG. 2 is a sectional view of the final drive unit illustrating a gear and sump channel.

To aid in distributing lubricant from the first reservoir 38 to the second reservoir 62, in at least some implementations, the inlet 92 is arranged generally tangentially to the gear 20 and is defined by an upstream portion 98 and a downstream portion 100 where, as shown in FIG. 2, the downstream portion 100 is closer to the gear 20 than is the upstream portion 98. The increased space at the upstream portion 98 enables more lubricant to enter the upstream portion than will flow past the downstream portion 100 which tends to strip off and direct at least some of the lubricant into the feed passage 90 to reduce the amount of lubricant that flows past the area of the inlet 92. The inlet 92 may also be positioned above the axis 76, with respect to the direction of the force of gravity, so that lubricant moved into the inlet and second reservoir 62 may take advantage of and flow under the force of gravity. In at least some implementations, the inlet 92 and outlet 96 of the feed passage 90 are located above the axis 76 and in some implementations, may be generally diametrically opposed to the lowest point of the first reservoir 38, where generally in this context means within 45 degrees of diametrically opposed.

Figure 11:
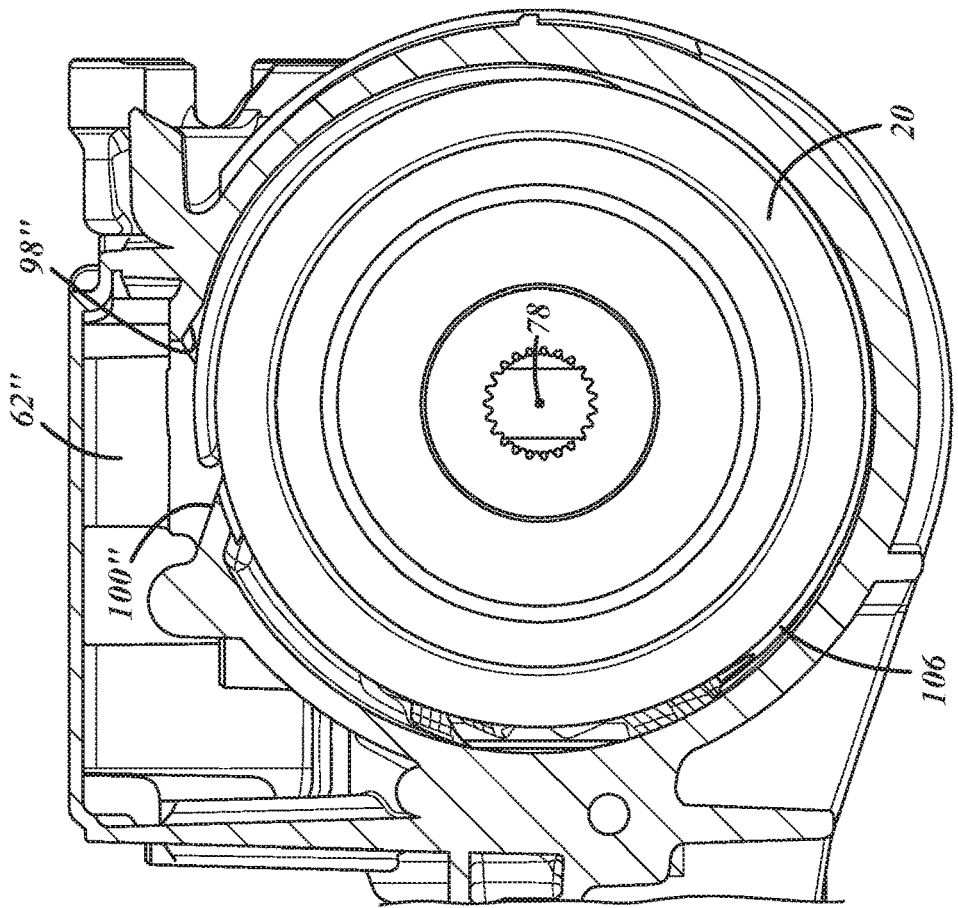
FIG. 11 is a sectional view of the final drive unit of FIG. 10.

Further, as shown in at least FIGS. 2 and 11, the upstream portion 98 of the inlet 92 (the portion upstream of a centerline 102 of the inlet 92 taken parallel to the axis 76) may be oriented at an angle $\alpha$ of between 30 to 60 degrees between a tangent line 104 taken at the upstream portion 98 and a line 105 extending from the upstream portion 98. A radial gap 106 between the periphery of the gear 20 and the main body 14 at the upstream portion 98 of the inlet 92 may be between 3 to 7 mm. The downstream portion 100 of the inlet 92 (the portion downstream of the centerline 102 of the inlet taken parallel to the axis 76) may be oriented at an angle $\beta$ of between 50 to 70 degrees between a line 107 tangent to the gear 20 at the downstream portion and a line 109 extending from the downstream portion 100. The radial gap 106 between the periphery of the gear 20 and main body 14 at the downstream portion of the inlet (e.g. the surface of the main body that defines that area of the inlet) may, in at least some implementations, be less than 3 mm, for example, between 0.3 mm and 3 mm.

As shown in FIGS. 2 and 6, to facilitate a centripetal pumping action or otherwise increase the movement of lubricant from the first reservoir to the feed passage 90 and second reservoir 62, the radial gap 106 between the gear 20 and adjacent inner surface of the main body 14 varies along its circumferential length. In at least some implementations, to ensure that the periphery of the gear 20 is wetted by lubricant even with relatively low levels of lubricant in the first reservoir, the gap 106 at the gravitational lowest point of the gear 20 is between 0.25 and 3 mm. To avoid unduly interfering with the flow of lubricant propelled by the gear 20, the radial gap 106 may increase between the lowest point of the gear 20 and the upstream portion 98 of the feed passage inlet 92, which as noted above, may be between 3 and 7 mm from the periphery of the gear 20. The change in radial dimension of a cavity 108 or area of the main housing 14 that is axially aligned with and adjacent to the gear 20 may be gradual (e.g. a smooth taper), stepped or otherwise as desired.

Figure 12:
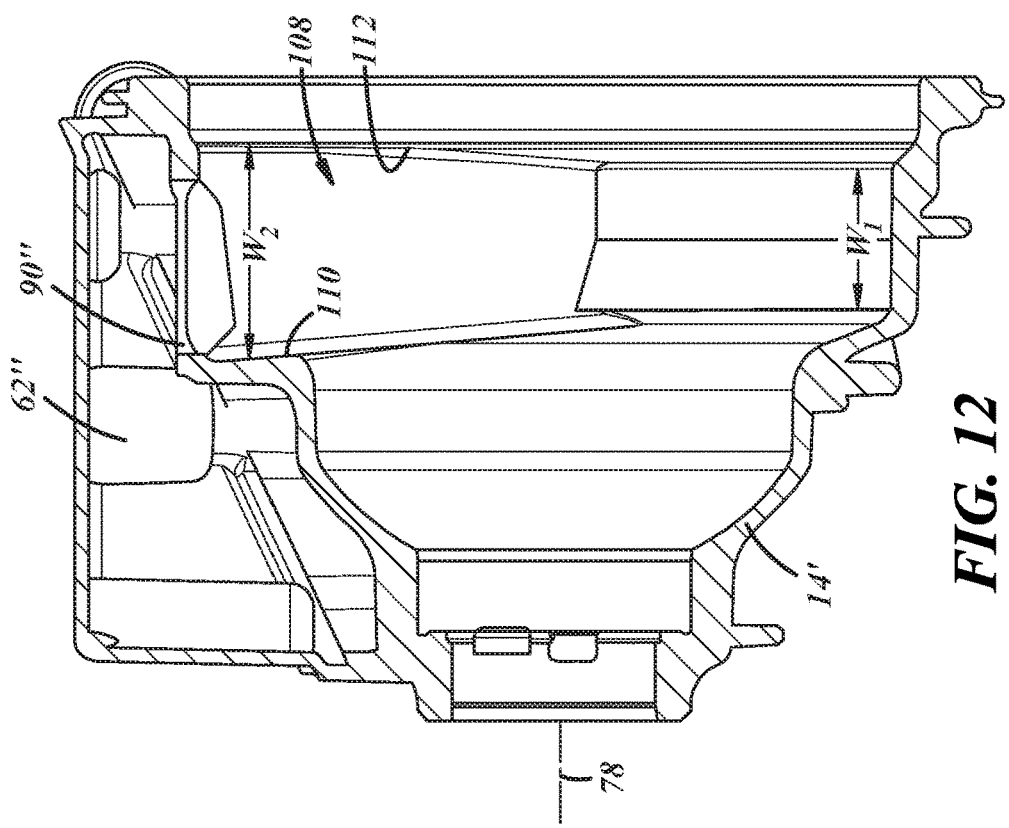
FIG. 12 is a sectional view of a portion of the drive unit housing.

In at least some implementations, such as is shown in FIG. 12 with regard to a different main body 14', the axial width of the cavity 108 or area of the of the main body 14' that is axially aligned with and adjacent to the gear 20 may be varied along the circumference of that area of the main body. In some instances, the axial width is less in the area of the first reservoir 38 than at a location circumferentially spaced from the first reservoir by sixty or more degrees. In some examples, the axial width $W_1$, may be less below the axis 78 (e.g. at or in the area of the gravitational lowest portion or the area of the first reservoir 38) and greater above the axis (e.g. at or near the feed passage inlet as shown at $W_2$). This may further direct lubricant toward the lower portion of the gear 20, may create a pumping action (e.g. venturi effect) and/or otherwise help the gear 20 propel lubricant toward the feed passage 90 without unduly interfering with the lubricant flow. In at least some implementations, the width of the cavity 108 or area of the main body 14' is measured between radially varied and circumferentially extending surfaces 110, 112 on both axial sides of the gear 20, and these surfaces 110, 112 may in whole or part be defined by components adjacent to the gear 20, such as the first cover 16 (e.g. a flange 113 extending into the interior 19 as shown in FIG. 6) and/or the second housing 64.

As shown in FIG. 5, in at least some implementations, a portion of the second housing 64 and thus, the second reservoir 62 may overlap an area in which the pinion gear 42 and ring gear 20 mesh and the second housing may include an outlet 114 located above (with respect to gravity) at least part of the mesh area. So arranged, lubricant may flow out of the outlet 114 and onto the mesh area to provide direct lubrication of the pinion and ring gears. The outlet 114 may be provided near the feed passage outlet 96 and may be sized to ensure a desired lubricant flow rate to the mesh area of the gears. Of course, the ring gear 20 is also lubricated as a portion of the ring gear moves through the first reservoir 38 and lubricant therein. Similarly, the second housing 64 and second reservoir 62 may overlap at least part of one of the differential gears 60 and the bearing 26, and the second housing 64 may include one or more additional outlets 116 through which lubricant flows under the force of gravity onto one or more of the differential gears and the bearing, or onto the shaft adjacent to the bearing. In sum, the second housing 64 may have outlets 114, 116 at different locations and in different orientations, to provide lubricant from the second reservoir 64 to desired areas and onto components within the interior 19 of the housing 12. Lubricant may flow under the force of gravity, and one or more drain outlets 117 (FIG. 3) may be provided at or near a gravitationally lowest point of the second reservoir 62 so that lubricant is not trapped in the second reservoir but instead flows back into the first reservoir 38. The drain outlets 117 may be sized to limit the flow rate of lubricant therethrough to, among other things, enable a volume of lubricant to accumulate in the second reservoir 62 and to reach other and higher (relative to gravity) outlets of the second housing 64 as noted above. In at least some implementations, a larger outlet 118 is provided above one or more smaller outlets 117 that are located at or near the lowest portion of the second reservoir 62. The larger outlet 118 may provide a primary flow of lubricant into the interior 19 from the second reservoir 62 to ensure that a sufficient or desired volume of lubricant remains in the first reservoir 38 sufficient to wet the ring gear 20 (i.e. to prevent too much lubricant from collecting for too long a period of time in the second reservoir). The heights of the outlets 116, 117, 118 (relative to gravity) and flow areas may be chosen as desired for a given application.

Figure 7:
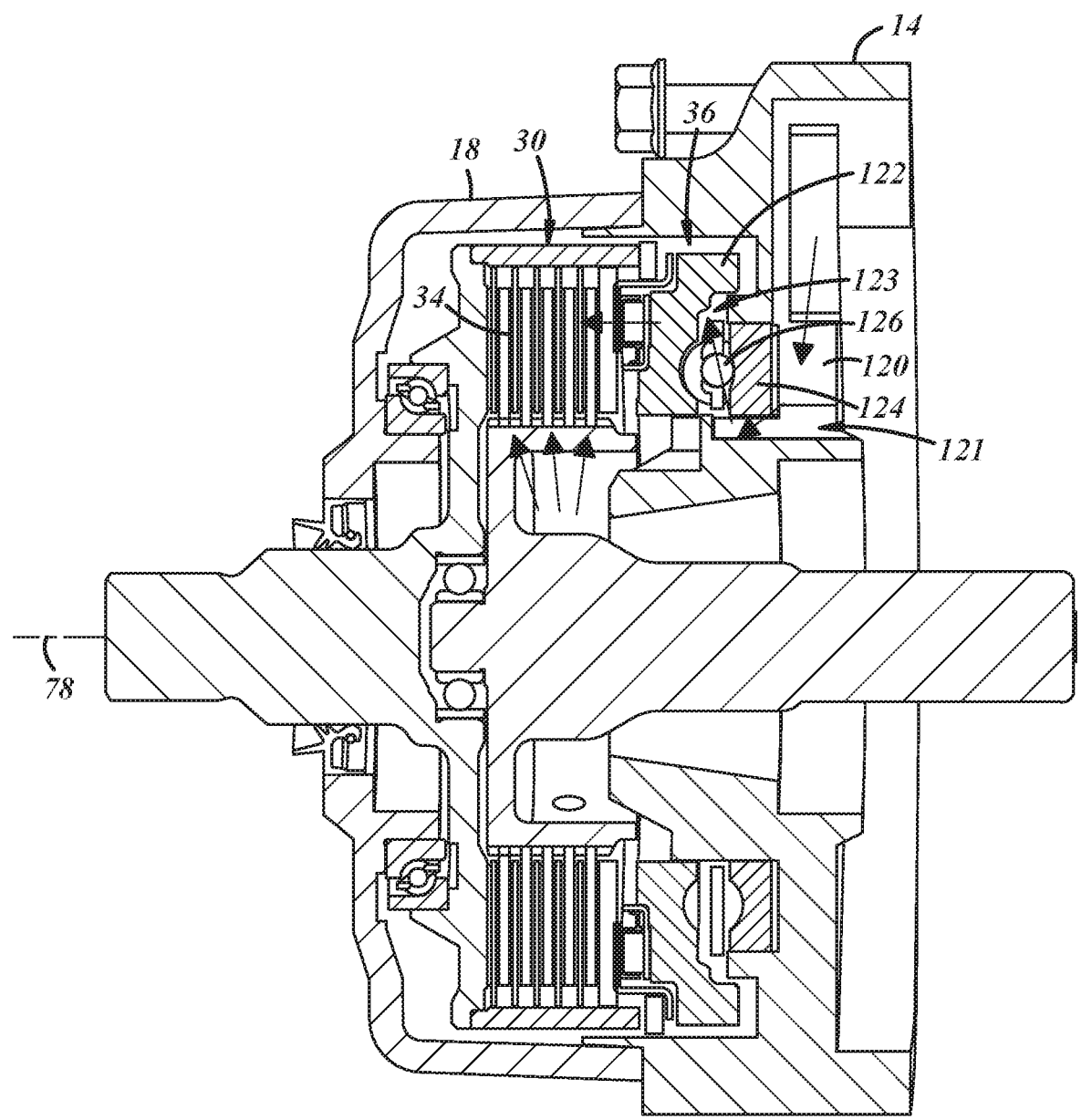
FIG. 7 is a sectional view of a portion of the final drive unit illustrating a clutch, clutch actuator and fluid path for both.

As noted above, certain components of the driveline unit 10 may be located on the opposite side of the wall 56 than the gears 20, 42 and second reservoir 62, and generally between the wall and the second cover 18. As shown in FIG. 7, to provide lubrication from the second reservoir 62 to one or more of the components on the other side of the wall 56, an outlet or lubricant passage 120 may be formed through the wall. This passage 120 may be provided above the height of the axis 78 (relative to gravity) to provide flow from a higher level to a lower level across the components being lubricated. In the example shown, the passage 120 leads to the clutch pack 34 and clutch actuator 36. A first flow path 121 is provided from the passage 120 to the clutch plate pack 34—and may be directed or flung upwardly upon engagement with the shaft 22 as the shaft spins or carried from a lower region of the clutch pack to an upper region as the plates spin with the shaft(s). A second flow path 123 is provided from the passage 120 to the plate pack 34 via the clutch actuator 36, which is shown as a ball-ramp mechanism having an axially movable plate 122, a reaction plate 124, a cam surface or ramp formed in one or both plates 122, 124 and a plurality of balls 126 between the plates and engaged with the cam surface.

As the movable plate 122 is rotated relative to the reaction plate 124, the engagement of the balls 126 with the ramp causes the movable plate to move axially relative to the reaction plate (i.e. toward and away from the reaction plate). When the movable plate 122 moves away from the reaction plate 124, a larger gap exists between them and lubricant may flow more freely to the plates, seals, bearing and other downstream components. During this movement, the clutch 32 is actuated and the plates are pressed together such that cooling the plates and lubricating components that rotate when the clutch is engaged is desired. When the movable plate 122 is moved toward the reaction plate 124, the gap between them decreases so the flow rate of lubricant might also decrease. This is generally acceptable because the clutch 32 is not actuated in this state and cooling and lubrication is less of a priority in this position of the clutch. Accordingly, in at least some implementations, the flow rate through the clutch actuator 36 is greater when the clutch 32 is actuated than when the clutch is not actuated, and the flow rate may be throttled or controlled, at least in part, by the clutch actuator.

The volume of the second reservoir 62 and the volume of lubricant provided in the driveline unit 10 may be controlled to provide a desired flow and distribution of lubricant during a wide range of operating conditions, including low and high rotational speeds, as well as low and high torque situations. In at least some implementations, in an at rest condition, wherein the shafts and gears are not spinning (e.g. the vehicle is not moving), the second reservoir 62 may be empty or nearly so and substantially all of the lubricant is within the first reservoir 38. In this state, from 10 to 25% of the radial extent of the gear 22 is wetted in lubricant (where the radius is taken from the axis 76 to the gravitational lowest point of the ring gear 22). In other words, if the ring gear 22 radius is 100 mm, along the noted radius, between 10 mm and 25 mm of the ring gear 22 would be immersed in lubricant and between 75 mm and 90 mm would not be immersed in the lubricant. This initial depth of lubricant is reduced when the vehicle is moving and the various shafts and gears are rotating and lubricant is expelled from the first reservoir 38 such that, when the vehicle is moving, less of the ring gear 22 is wetted by lubricant in the first reservoir. At higher rotational speeds, such as wheel speeds between 100 rpm and 2000 rpm (and at least in some implementations the ring gear rotational speed is effectively the wheel speed), the radial extent of the ring gear that is wetted by lubricant in the first reservoir 38 decreases to between 5 to 15% as lubricant is expelled from the first reservoir. As noted above, for at least some higher rotational speeds, some of that lubricant is moved into and through the feed passage 90 and into the second reservoir 62, as well as splashed elsewhere in the interior 19.

The greater the volume of the second reservoir 62, and the slower the flow rate through the outlet(s) of the second reservoir, the less the volume that remains in the first reservoir 38 during operation of the vehicle, which again, depends upon the rotational speed of the components. At higher rotational speeds, components may need more cooling and lubrication, and this is achieved by improved and more controlled distribution of the lubricant via the second reservoir 62 and its strategically located outlets. Further, the effective distribution of lubricant at higher speeds, as provided for and described herein, reduces drag and resistance to rotation of the ring gear 20 as it rotates through less lubricant 40, for example, when the second reservoir 62 receives lubricant. At lower speeds, components may need less cooling and lubrication and the lubricant is inherently moved less at lower speeds. Further, higher temperatures often exist within the driveline unit 10 at higher speeds, and the viscosity of the lubricant decreases which reduces the lubricant's resistance to being moved throughout the housing 12 and can improve flow of the lubricant under such conditions. While a ring gear is shown and described, the innovations noted herein may be applied to any gear used to move lubricant within a housing and is not limited to a ring gear or crown wheel. The driven gear can be coupled to any shaft and need not be associated with a differential.

Figure 8:
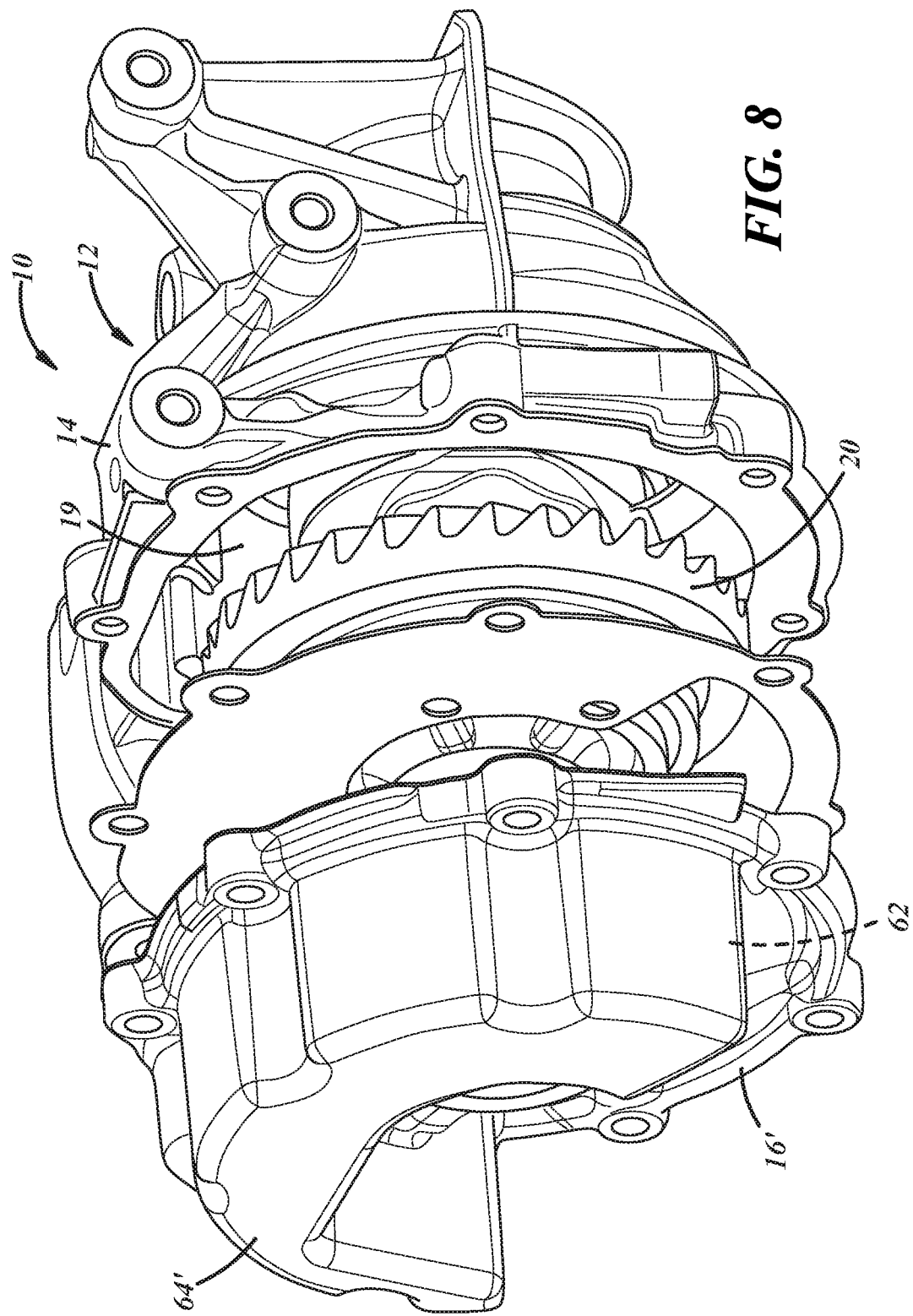
FIG. 8 is an exploded perspective view of a final drive unit and secondary sump.
Figure 9:
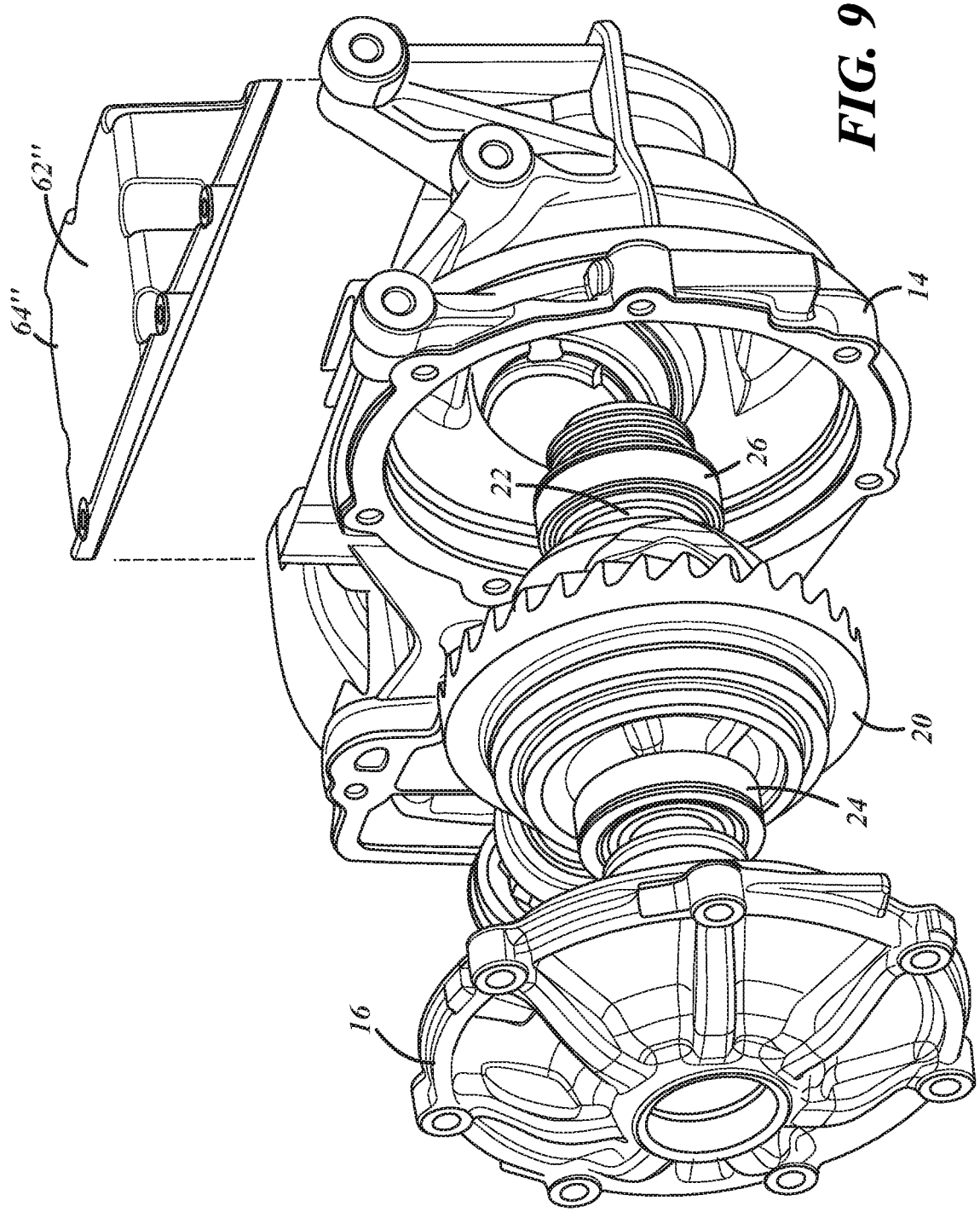
FIG. 9 is an exploded perspective view of a final drive unit and secondary sump.
Figure 10:
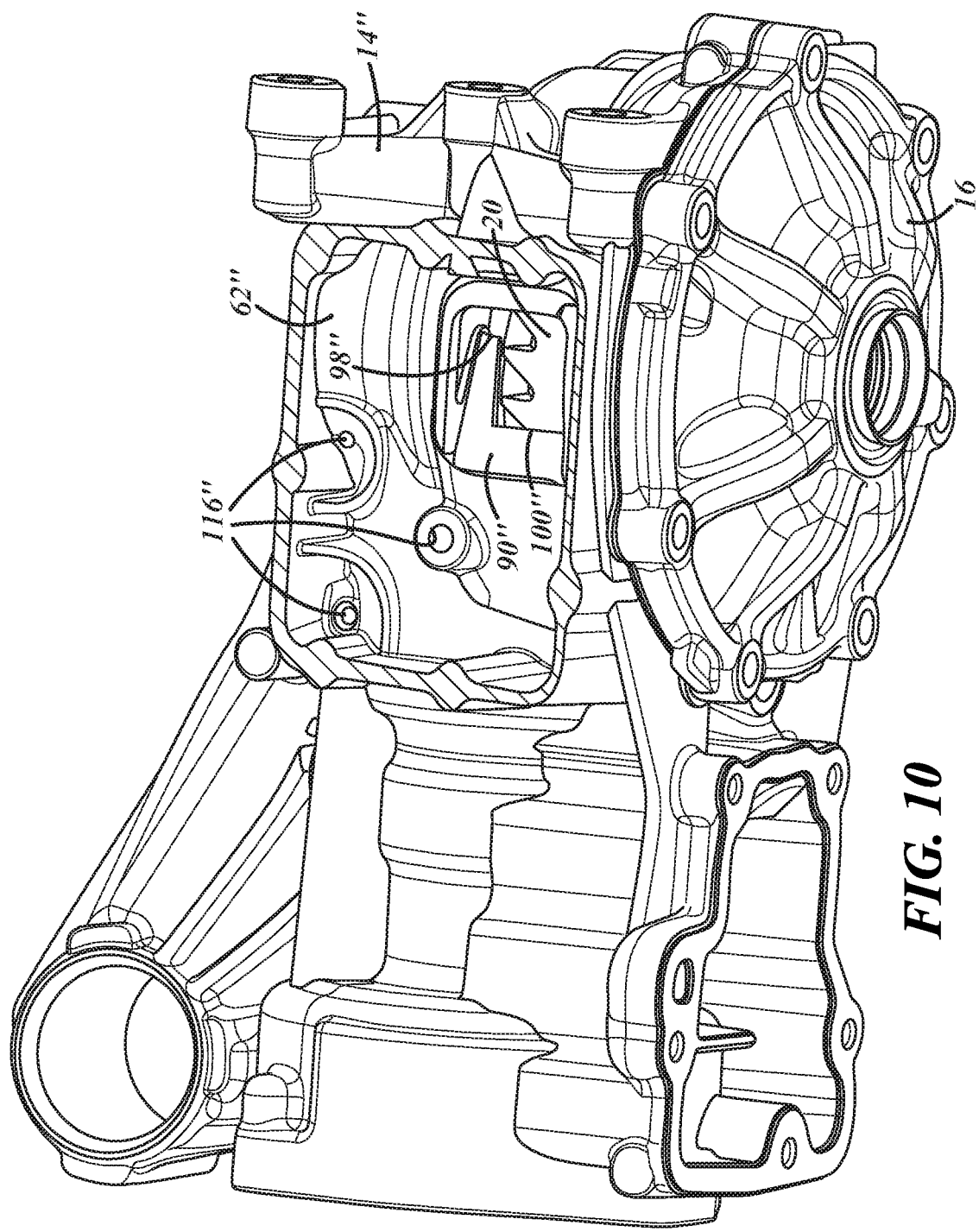
FIG. 10 is a perspective view of a final drive unit illustrating a secondary sump integral with a housing of the unit.

While the second housing 64 and second reservoir 62 may be located within the interior 19 as noted above, FIG. 8 shows an arrangement wherein the second housing 64' is coupled to the first cover 16' and extends outwardly from the first cover. In this arrangement, the second reservoir 62' is defined between the second housing 64' and an exterior surface of the first cover 16' and is fully or mostly (i.e. a majority) outside of the interior 19 of the housing 12. A feed passage may lead from the inlet to an outlet that opens into the second housing 64' so that some lubricant is directed into the second reservoir 62' as desired. This second reservoir 62' may be provided instead of or in addition to the second reservoir noted above. Further, this second housing 64' may be integrally formed with the first cover 16 (e.g. from the same piece of material), or a separate component fixed and sealed thereto.

Figure 13:
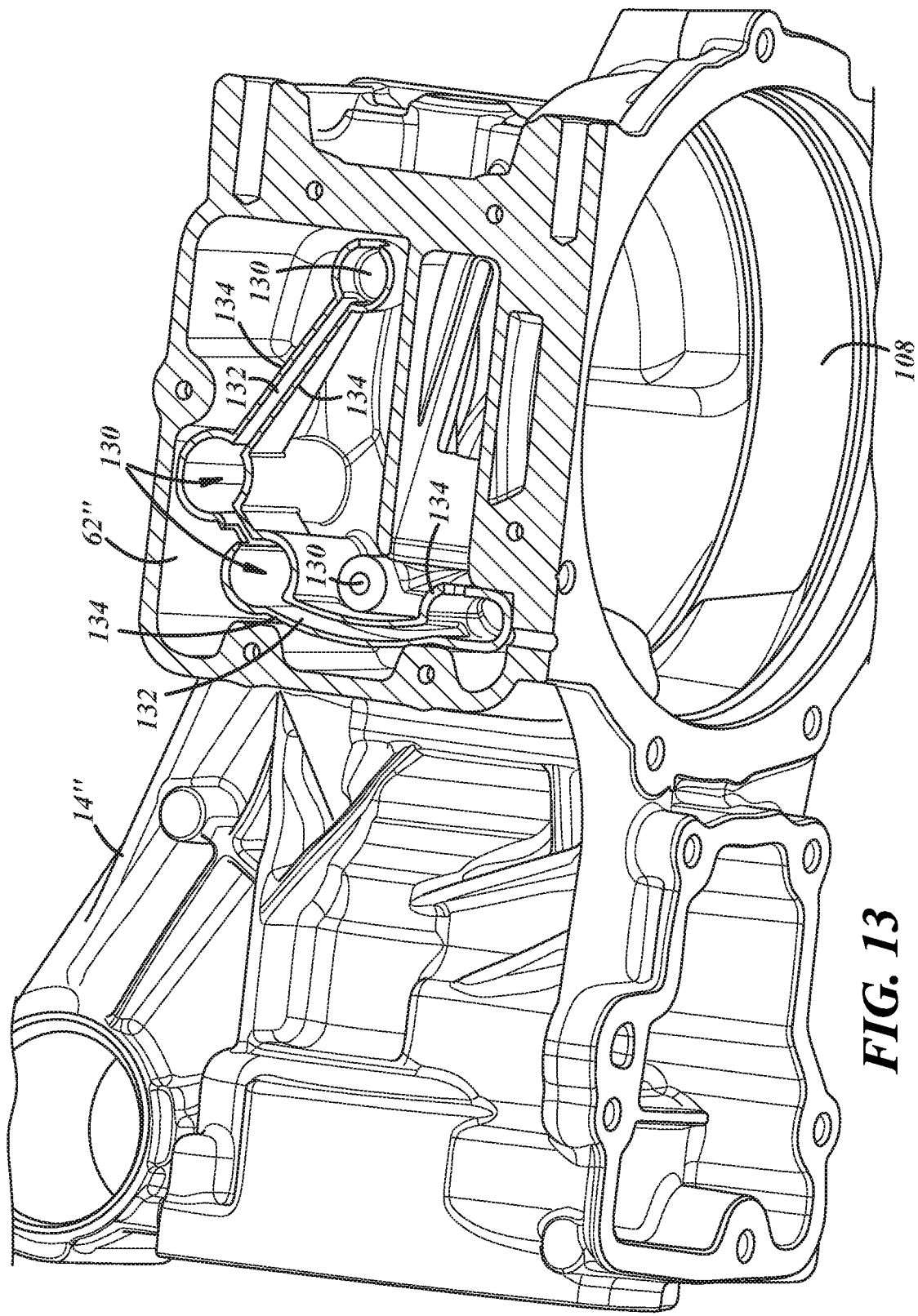
FIG. 13 is a sectional view of the housing.
Figure 14:
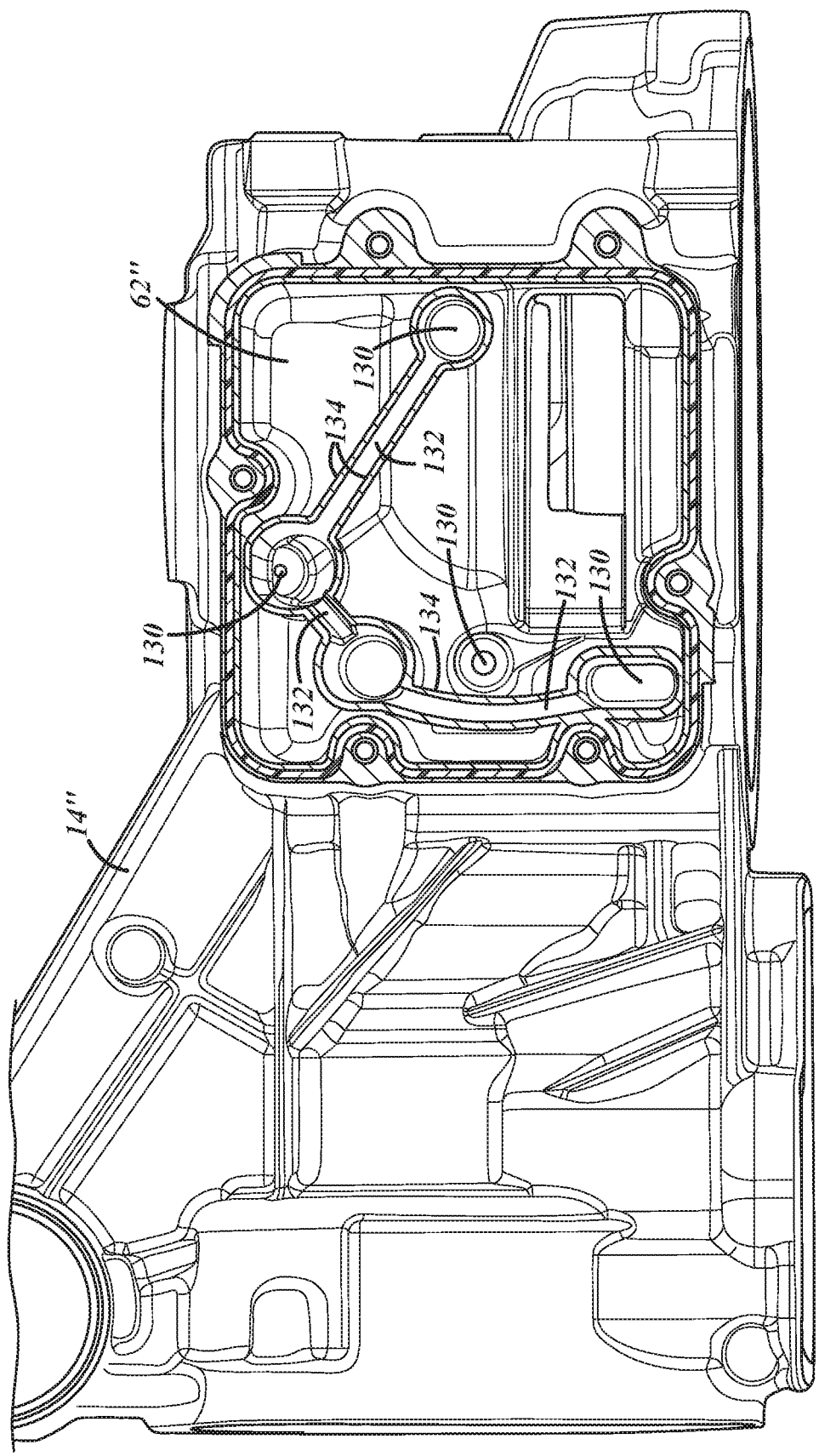
FIG. 14 is a sectional view of a portion of the housing.

FIGS. 9-12 and 13-14 illustrate similar arrangements wherein a second reservoir 62" is defined in an upper portion of the main body 14 and is enclosed by a second housing 64" in the form of a cover secured to the main body and enclosing the second reservoir. The feed passage 90" may provide lubricant into this second reservoir 62" in the same manner previously described and the outlets of the second housing 64" may be provide at varying heights (relative to gravity) and of varying flow areas to control when and how much lubricant flows through the outlets 116" of the second reservoir 62". The outlets 116" may also be oriented in desired directions and located in desired positions to direct lubricant as desired within the housing 12. In the example of FIGS. 13 and 14, some of the outlets 130 are connected together by passages or channels 132 that extend between them, and these outlets may be located within upstanding or raised flanges 134 having an open end at a desired height to provide flow through the outlets 130 only when the second reservoir 62" includes lubricant at a higher level or volume.

While the forms of the invention herein disclosed constitute presently preferred embodiments, many others are possible. For example, while the second reservoir has been described, in at least some implementations, as being defined by two bodies (e.g. a second housing and the main body or a cover), the second reservoir could be a cast or molded feature in the main body of the housing, or either or both of the first and second covers. In such examples, the second housing may be considered to be a portion of the component, such as a wall or walls, in which the lubricant reservoir is defined. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An automotive driveline unit, comprising:
    a main housing having an interior and a first reservoir in the interior arranged to collect lubricant, the main housing also having a feed passage that is open to the first reservoir;
    a gear located within the interior and having a periphery arranged in the first reservoir so that rotation of the gear causes the gear to engage and displace some of the lubricant from the first reservoir; and
    a second housing carried by the main housing with a second reservoir defined between the interior of the main housing and the second housing, the second reservoir being communicated with the first reservoir via the feed passage and including multiple, spaced apart outlets through which lubricant exits the second reservoir at different locations to provide lubricant to different areas of the interior of the main housing, wherein the second housing has a sidewall with first and second ends, an end wall coupled to the first end of the sidewall and an open end that is defined by the second end of the sidewall, and wherein the second end of the sidewall is engaged with the main housing or received within a void formed in the main housing to define the second reservoir between the main housing, the sidewall and the end wall.

2. The unit of claim 1 wherein a retention feature is carried by the second housing and engages the main housing to retain the position of the second housing relative to the main housing.

3. The unit of claim 1 wherein the gear is a driven gear that rotates about an axis and a drive gear engages the driven gear at a mesh area and wherein a portion of the second housing is disposed radially outwardly of and axially overlapped with the mesh area.

4. The unit of claim 3 wherein the driven gear is coupled to a shaft and the sidewall is radially outwardly spaced from the shaft and the sidewall axially overlaps the shaft.

5. The unit of claim 1 wherein the main housing includes a groove in which is received at least 30% of the length of the second end sidewall.

6. The unit of claim 1 wherein the feed passage includes an inlet arranged radially outwardly of the gear relative to a rotational axis of the gear, and the feed passage includes a midsection that extends axially from the inlet to an outlet that is open to the second reservoir.

7. The unit of claim 6 wherein the inlet is arranged generally tangentially to the gear and is defined by an upstream portion and a downstream portion wherein the downstream portion is closer to the gear than is the upstream portion.

8. The unit of claim 3 wherein the second housing includes a first outlet located radially above the mesh area so that fluid that exits the first outlet under the force of gravity engages at least one gear in the mesh area.

9. An automotive driveline unit, comprising:
a main housing having an interior and a first reservoir in the interior arranged to collect lubricant, the main housing also having a feed passage that is open to the first reservoir;
a gear located within the interior and having a periphery arranged in the first reservoir so that rotation of the gear causes the gear to engage and displace some of the lubricant from the first reservoir; and
a second housing carried by the main housing with a second reservoir defined between the interior of the main housing and the second housing, the second reservoir being communicated with the first reservoir via the feed passage and including multiple, spaced apart outlets through which lubricant exits the second reservoir at different locations to provide lubricant to different areas of the interior of the main housing wherein the main housing includes a wall having an enclosed portion that defines part of the second reservoir and a lubricant outlet is formed through the wall in the enclosed portion to provide lubricant to components on an opposite side of the wall as the second housing.

10. The unit of claim 1 which also comprises multiple differential gears and wherein the second housing is radially outwardly of and axially overlaps at least one part of one differential gear.

11. The unit of claim 1 wherein the second reservoir is located within the interior of the main housing.

12. An automotive driveline unit, comprising:
a main housing having an interior defined at least partially between a main body and a cover connected to the main body, and a first reservoir in the interior arranged to collect lubricant, the main housing also having a feed passage that is open to the first reservoir and a wall with a first opening and wherein the main housing includes a second opening spaced from the wall;
a first shaft extending through the first opening and having at least a portion within the interior;
a first gear coupled to the first shaft for rotation with the first shaft, the first gear being located within the interior, and the first gear having a portion of its periphery located in the first reservoir so that rotation of the first gear causes the first gear to engage and displace some of the lubricant from the first reservoir;
a second shaft extending through the second opening and having at least a portion within the interior, the second shaft being oriented so that it is not parallel to the first shaft;
a second gear coupled to the second shaft for rotation with the second shaft, the second gear meshed with and rotating the first gear, and the second gear being received within the interior;
a second housing separate from the cover, carried by the main housing and defining at least part of a second reservoir that is in communication with the first reservoir via the feed passage, the second reservoir includes multiple, spaced apart outlets through which lubricant exits the second reservoir at different locations to provide lubricant to different areas of the interior of the main housing, at least two outlets are arranged at different heights relative to gravity and at least two outlets have different flow areas to control the distribution of lubricant from the second reservoir.

13. The driveline unit of claim 12 wherein the second housing is coupled to the main housing and the second reservoir is defined between the second housing and a portion of the main housing.

14. The driveline unit of claim 13 wherein the portion of the main housing to which the second housing is coupled includes the wall.

15. The driveline unit of claim 14 wherein an outlet of the second reservoir extends through the wall.

16. The driveline unit of claim 12 wherein a portion of the second housing is disposed radially outwardly of and axially overlapped with at least a portion of the area in which the second gear and first gear are meshed.

17. The driveline unit of claim 12 wherein the first gear is received in a portion of the main housing that has a varying radial dimension so that a gap between the periphery of the first gear and the main housing is not of constant radial dimension.

18. The driveline unit of claim 17 wherein the gap is smaller in the area of the first reservoir than it is at a location outside of the first reservoir.

19. The driveline unit of claim 17 wherein an axial width of said portion of the main housing in which the first gear is received varies along the circumferential extent of said portion of the main housing.

20. The driveline unit of claim 19 wherein the axial width is less in the first reservoir than at a location circumferentially spaced from the first reservoir by 60 or more degrees.

* * * * *